Aug. 12, 1958     C. H. CARLSON     2,846,773
CHECKING CUTTER TEETH
Filed Feb. 1, 1957                              7 Sheets-Sheet 1
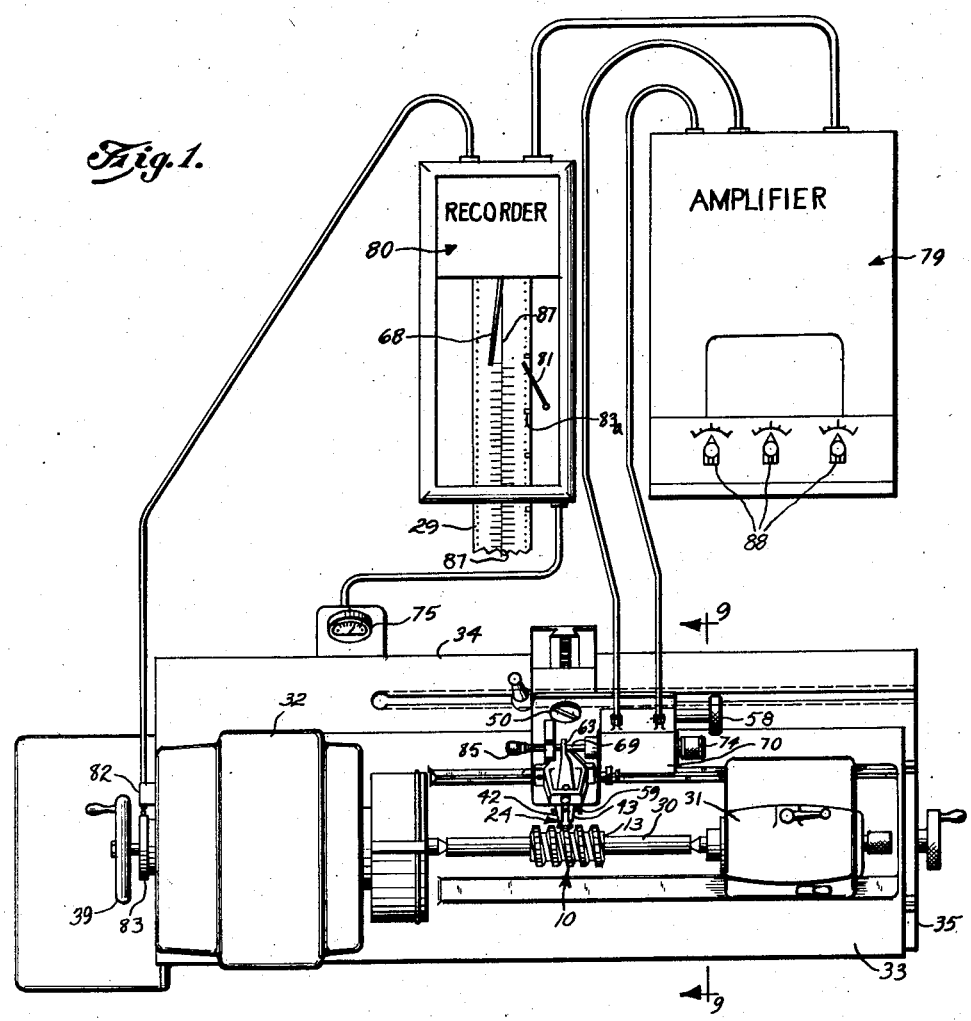
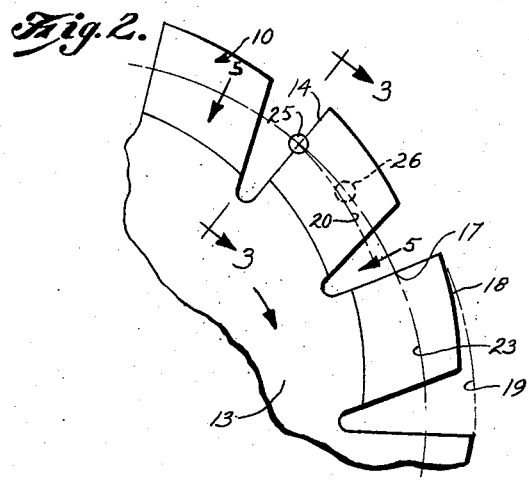
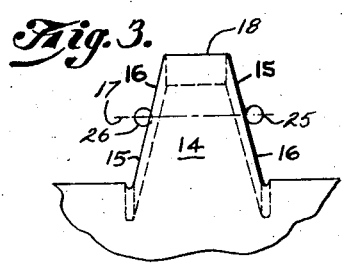
INVENTOR.
Carol H. Carlson
BY
ATTORNEYS Aug. 12, 1958 — C. H. CARLSON — 2,846,773
CHECKING CUTTER TEETH
Filed Feb. 1, 1957 — 7 Sheets-Sheet 2
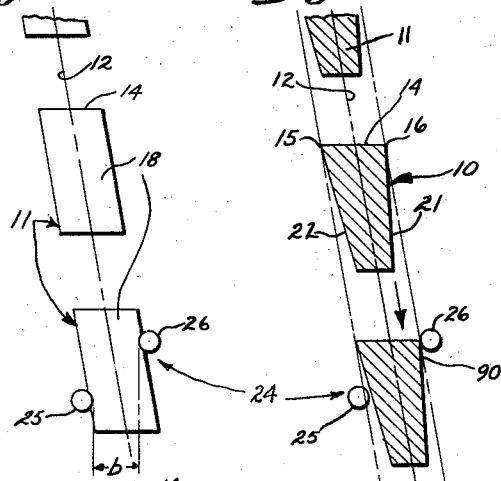
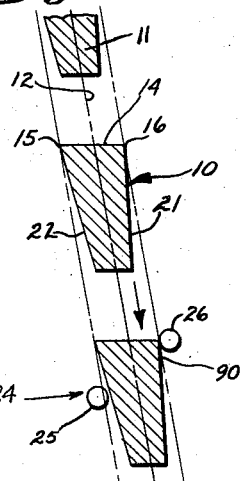
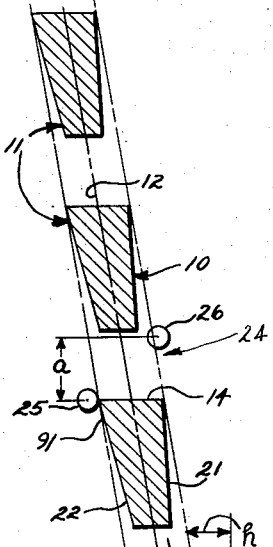
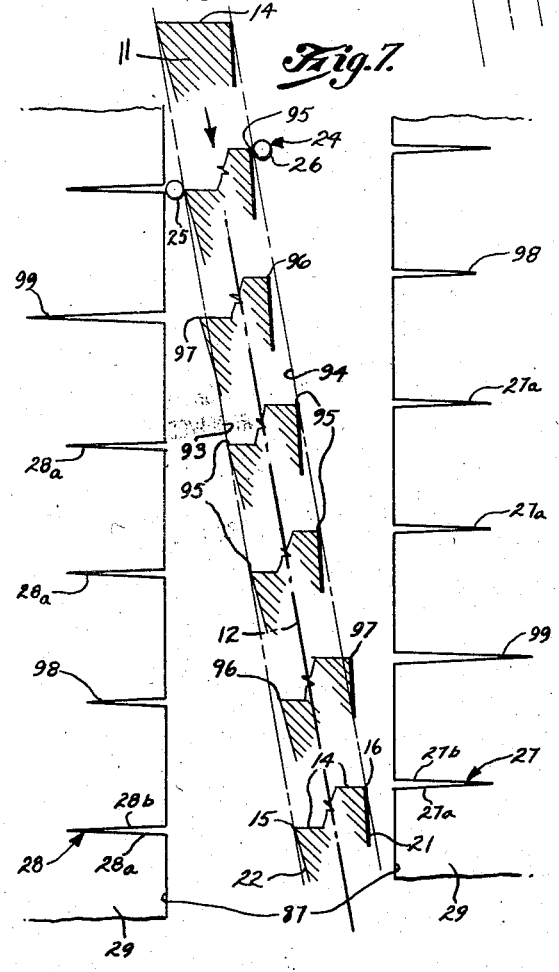
INVENTOR.
Carol H. Carlson INVENTOR.
Carol H. Carlson

ATTORNEYS

Aug. 12, 1958   C. H. CARLSON   2,846,773
CHECKING CUTTER TEETH

Filed Feb. 1, 1957   7 Sheets-Sheet 4

INVENTOR.
Carol H. Carlson

BY
ATTORNEYS

Aug. 12, 1958     C. H. CARLSON     2,846,773
CHECKING CUTTER TEETH

Filed Feb. 1, 1957     7 Sheets—Sheet 5

INVENTOR.
Carol H. Carlson
BY
ATTORNEYS

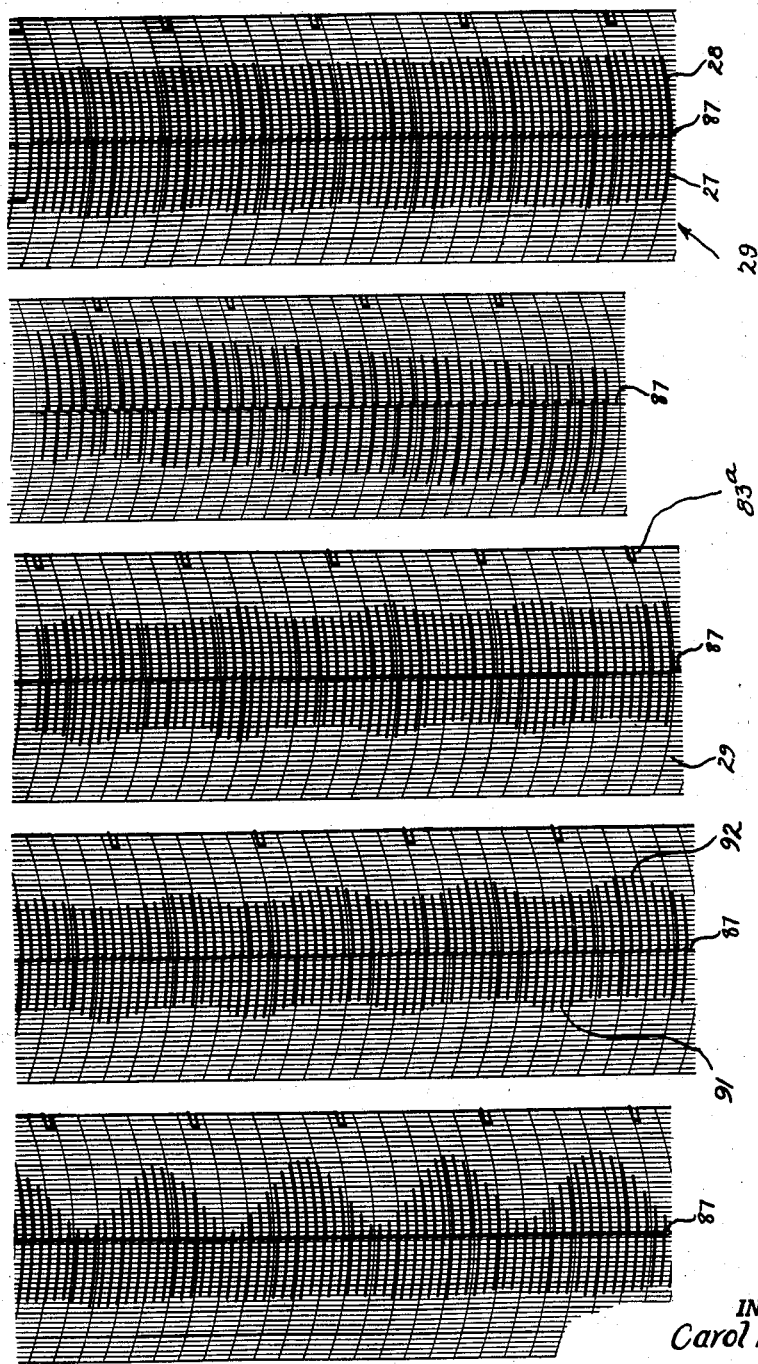

Aug. 12, 1958 — C. H. CARLSON — 2,846,773
CHECKING CUTTER TEETH

Filed Feb. 1, 1957 — 7 Sheets-Sheet 7

INVENTOR.
CAROL H. CARLSON
BY
ATTORNEYS

United States Patent Office 2,846,773
Patented Aug. 12, 1958

2,846,773

CHECKING CUTTER TEETH

Carol H. Carlson, Rockford, Ill., assignor to Barber-Colman Company, Rockford, Ill., a corporation of Illinois Application February 1, 1957, Serial No. 637,717

7 Claims. (Cl. 33—179.5)

This invention relates to a machine for checking the location of the sides or flanks of the teeth arranged in a row in a multiple tooth cutter such for example as a hob. The invention has more particular reference to checking of cutter teeth by sensing dimensional variations through the use of a feeler engaged and moved by the passing teeth. In cutters of this character, the teeth are usually arranged in a plurality of parallel rows so that opposed sides of the teeth of adjacent rows constitute the walls of an intervening groove paralleling the tooth rows.

The primary object is to provide a checker of the above character in which two cutter tooth sides are felt of and checked dimensionally in a single pass through a feeling position.

A more detailed object is to feel of the oppositely facing tooth sides successively by two feelers arranged in a novel manner for engagement one at a time with respective tooth sides.

Another object is to bring the tooth sides into engagement with the feelers in a novel manner so as to simultaneously check several positional characteristics of the cutter such as lead, run-out, wobble, etc.

The invention also resides in the novel mounting of the feelers and in the manner of amplifying and recording their movements.

Other objects and advantages of the invention will become apparent from the following detailed description taken in connection with the accompanying drawings, in which Figure 1 is a plan view of a preferred form of cutter checking machine embodying the novel features of the present invention.

Fig. 2 is a fragmentary end view of part of a cutter to be checked.

Fig. 3 is a fragmentary elevational view of the front face of one of the cutter teeth.

Fig. 4 is a fragmentary development view of part of the cutter teeth.

Figs. 5 and 6 are similar development sectional views taken along the arcuate line 5—5 of Fig. 2.

Fig. 7 is a diagrammatic view illustrating the various feeler movements.

Figs. 15, 16, 17, 18, and 19 are charts produced in the testing of different cutters in accordance with the present invention.

Figure 9:
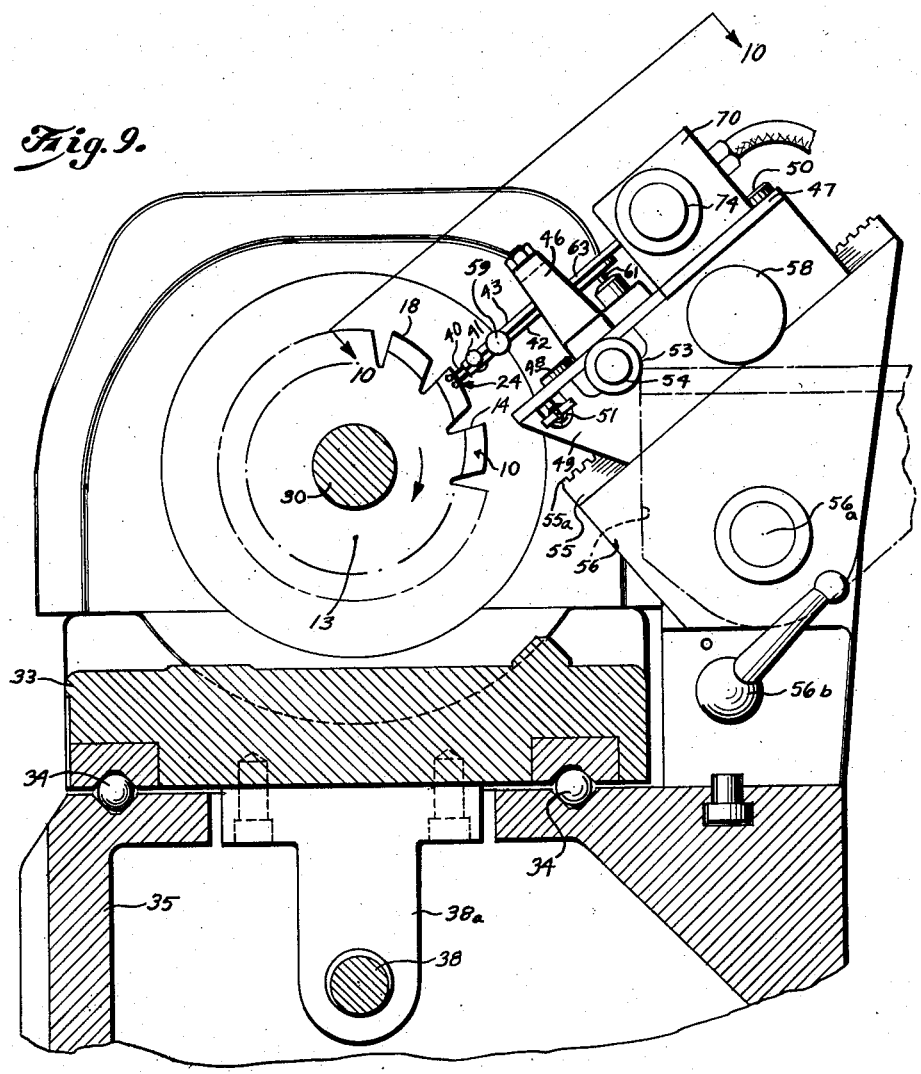
Fig. 9 is a vertical sectional view taken along the line 9—9 of Fig. 1.
Figure 8:
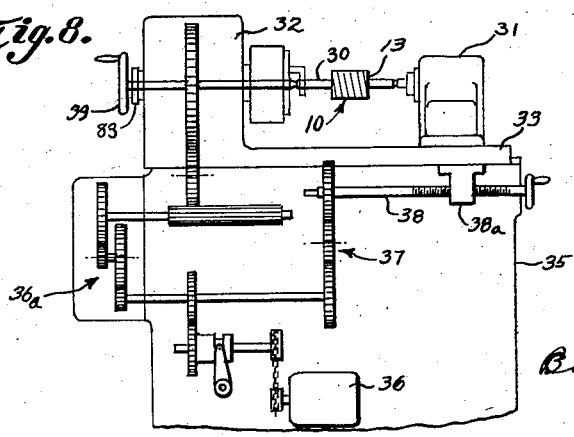
Fig. 8 is a schematic view of the cutter drive and feed mechanism.
Figure 10:
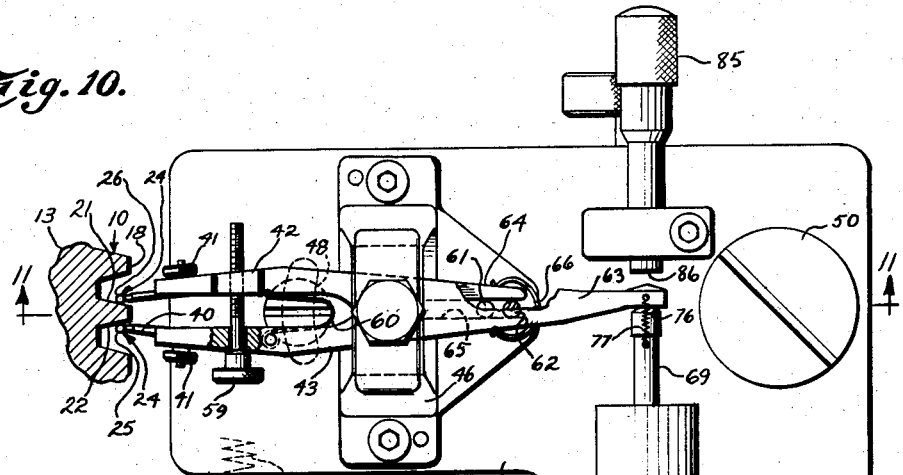
Fig. 10 is a fragmentary plan view of the mechanism shown in Fig. 1, the cutter being shown in section.
Figure 12:
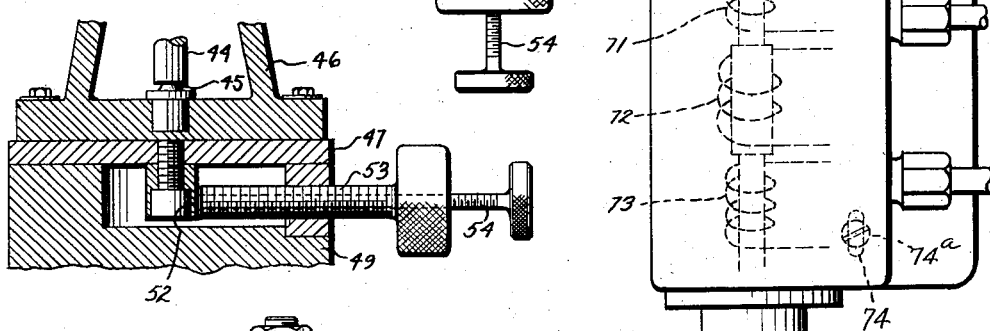
Fig. 12 is a fragmentary section taken along the line 12—12 of Fig. 11.
Figure 11:
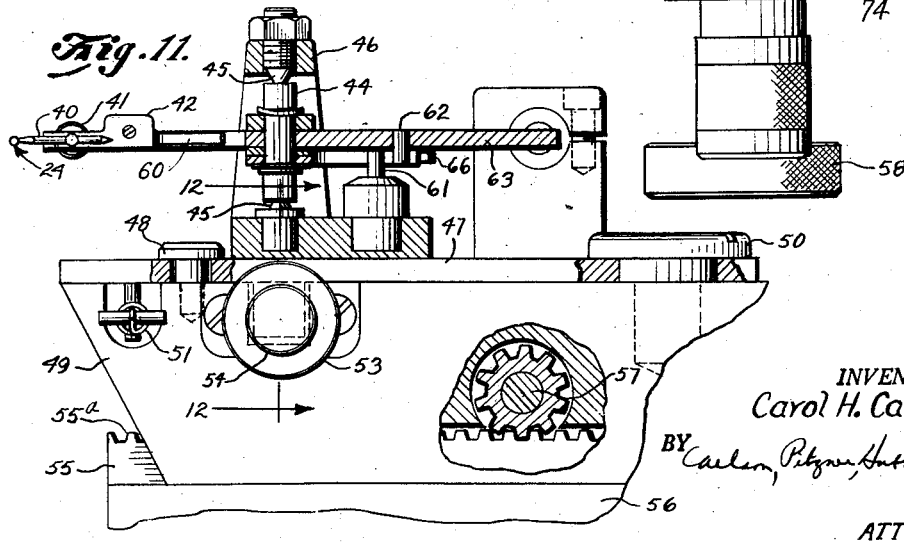
Fig. 11 is a fragmentary section taken along the line 11—11 of Fig. 10.
Figure 13:
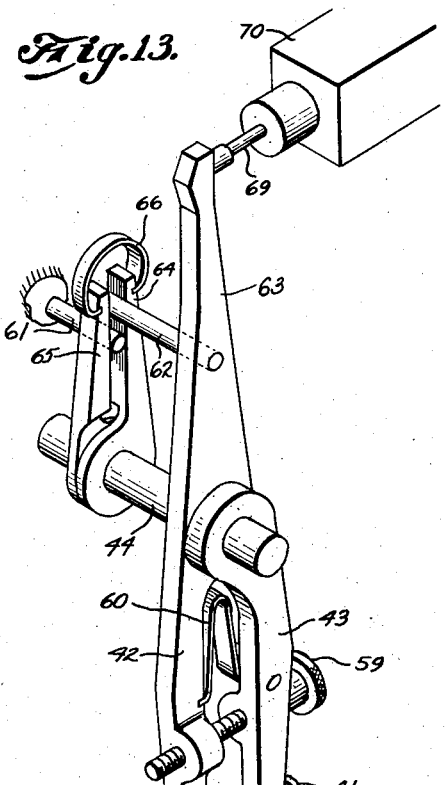
Fig. 13 is a fragmentary perspective view of the feeler or position sensing mechanism.
Figure 14:
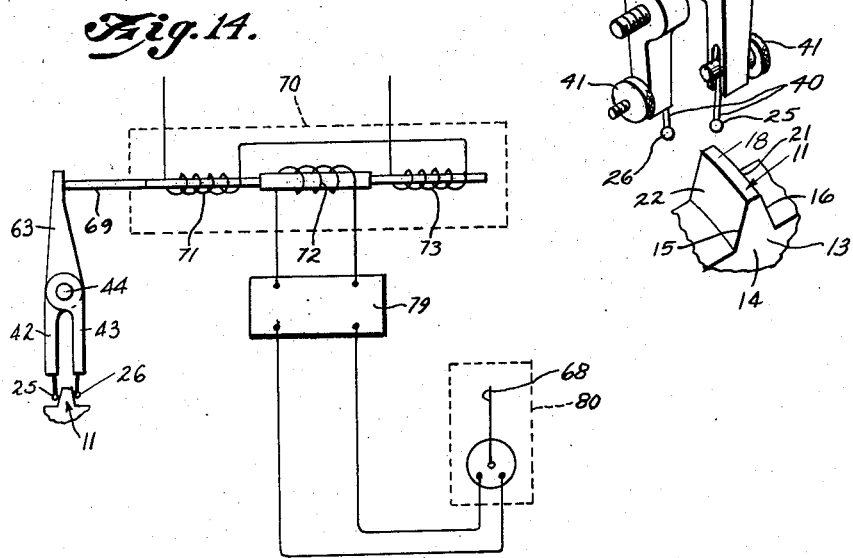
Fig. 14 is a schematic view and partial wiring diagram of the displacement magnifying and recording mechanism.
Figure 20:
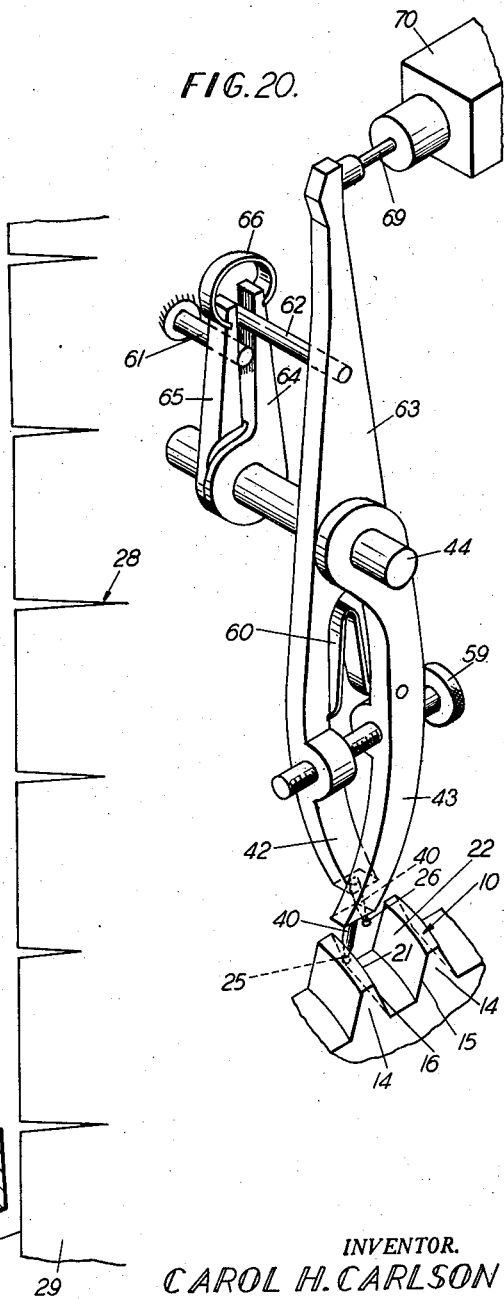

Fig. 20 is a perspective view similar to Fig. 13 showing a modified arrangement of the feelers.

Figure 21:
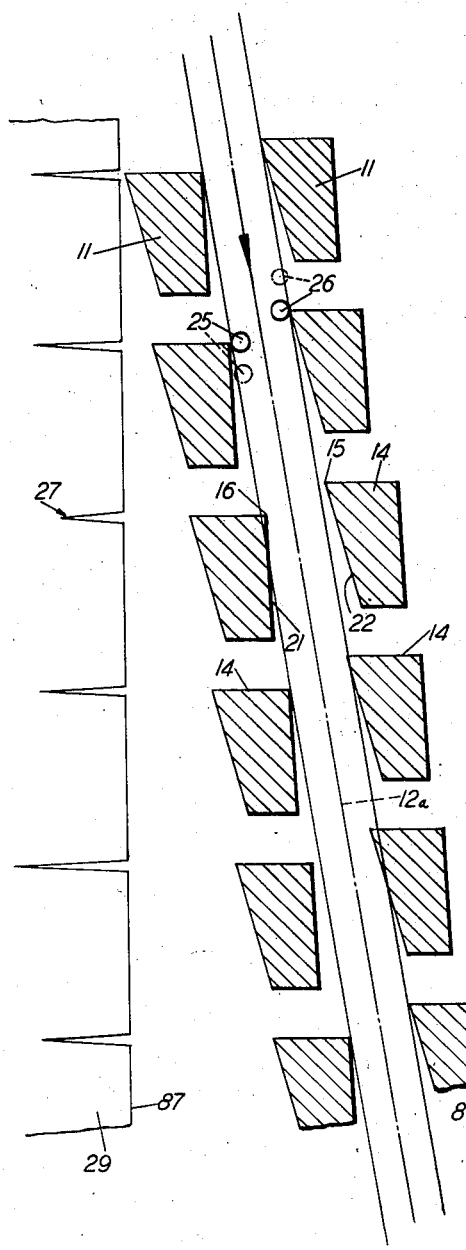

Fig. 21 is a diagrammatic view similar to Fig. 7 and illustrating the action of the modified feeler arrangement.

The invention is illustrated in the drawings as a machine and method for automatically checking several dimensional characteristics including the lead on both sides of the teeth of a hob 10 and simultaneously recording variations in these characteristics. A cutter of this type comprises a row of teeth 11 extending along a helical center line 12, usually through several revolutions, around the hob body 13, the angle $h$ (Fig. 6) of the helix being known as the lead angle. Each tooth has a cutting face 14 conforming in cross section to the interdental spaces of the gear to be generated by the hob so that opposite side edges 15 and 16 (Figs. 3 and 5) of each face converge outwardly from points 17 on the pitch line of the tooth. To maintain the same contour of the teeth after each sharpening by grinding away the faces 14, the hob teeth are "backed off" that is, the top surface 18 of each tooth, although of uniform width as shown in Fig. 4, is curved inwardly toward the hob axis (see Fig. 2) and away from a circumference 19 through the tip of the cutting face. The pitch lines 20 along the tooth flanks 21 and 22 are similarly curved inwardly so that, as shown in Fig. 5, the longitudinal section of each tooth taken along a circumference 23 (Fig. 2) concentric with the hob axis through the pitch points 17 at the cutting face 14 tapers away from this face in a direction reverse to the direction of rotation of the hob in service use.

In adapting the present invention to the checking of hobs, advantage is taken of this back off characteristic to enable oppositely facing side edges 15 and 16 of the cutting faces 14, either of the same tooth or the teeth of adjacent rows, to be engaged and felt of successively and variations in the positions of these edges relative to the helical path of travel thereof to be sensed in a single pass of the cutter teeth past a feeling unit 24. Such feeling of the tooth flanks is effected by feeler elements 25 and 26 which, in the preferred form shown in Figs. 1 to 19, are disposed on opposite sides of a helical center line 12 and mounted on a common support movable transversely of such line to enable the elements to engage the flanks on opposite sides of a tooth passed between the feelers. At the same time, the feeler elements are spaced apart by an amount $a$ (Fig. 6) longitudinally of the line 12 for successive engagement with the tooth edges 15 and 16 and also transversely of the line $a$ distance $b$ (Fig. 4) slightly less than the width of the cutting faces 14 at some predetermined point 17 along the edges such for example as points along the pitch line 20.

The hob is rotated and fed axially as indicated by the arrows in Figs. 6 and 7 to advance the teeth along the center line 12 and present the side edges 15 and 16 first to one feeler 25 and then the other 26 whereby one feeler is cammed outwardly while the other is out of engagement with the hob tooth. The successive movements of the feelers are amplified and recorded as marks 27 and 28 (Fig. 7) arranged in rows of a traveling tape 29 (Fig. 1) for ready comparison with each other.

While being checked in the above manner, the hob 10 is fastened on an arbor 30 supported at opposite ends in tail and head stocks 31 and 32 mounted on a table 33 slidable longitudinally of the arbor along guides 34 on a bed 35 housing a drive motor 36. Through suitable chain and gear connections 36$^a$ including pick off gears, the arbor may be turned at the speed desired for presenting successive teeth of the hob to the feelers 25 and 26. At the same time, the motor operates through suitable gearing 37 including a manually shiftable clutch and pick-off gears to turn a lead screw 38 and thus advance a nut 38ª and the table 33 at a rate corresponding to the lead of the teeth on the hob being checked. The teeth are thus presented to the feelers successively and in precisely centered relation with respect to the center line 12. For set up purposes, the hob may be turned independently of the lead screw by manipulating a hand wheel 39.

The feeler unit 24 is supported on the machine base 35 for adjustment in various ways and includes the feelers 25 and 26 which may take the form of small balls. Herein these balls are attached to the ends of rods 40 projecting from and detachably clamped by screws 41 in the ends of elongated levers 42 and 43 lying alongside each other and fulcrumed intermediate their ends on a pin 44 (Fig. 11) whose opposite ends are pivoted on center points 45 on a post 46 upstanding from a plate 47. The latter is held by a headed screw 48 against the top of a slide 49 and the end remote from the feeler points is fulcrumed on a stud 50 on the slide so that by swinging of the plate the feeler unit may be adjusted in a direction longitudinally of the hob axis. Under the action of a spring 51, a projection depending from the plate 47 is held against a stop 52 formed by a screw 53 and associated vernier screw 54 carried by the slide 49. The latter (Figs. 9 and 11) is slidable toward and away from the hob along ways 55 on the base 35, this adjustment being effected through a rack 55ª carried by a bracket 56 and meshing with a pinion 57 mounted on the slide and operated by a hand knob 58. The bracket is fulcrumed at 56ª on the machine base to swing about an axis paralleling the cutter arbor, the adjusted position being retained by a clamp actuated by a handle 56ᵇ.

The feelers 25 and 26, although mounted on the two part support formed by the levers 42 and 43, may be adjusted relative to each other laterally of the path of advance of the hob teeth being checked but, during the actual feeling of the teeth, these feelers move together as a unit away from and toward a normally centered position shown in Fig. 4. For the separation adjustment, the arms are joined by a cross screw 59 (Fig. 10) which projects through and abuts against the arm 43 and threads into the arm 42. A spring acting between the arms holds the arm 43 against the head of the screw, the two arms thus being joined to swing in unison about the pivot 44.

The normally centered position of the feeling unit is determined by a stop 61 (Figs. 10, 11 and 13) in the form of a post upstanding from the plate 47 and coacting with a stud 62 rigid with and depending from a rearwardly projecting extension 63 of the arm 42. This pin is disposed between two arms 64 and 65 fulcrumed on the pivot 44 and projecting rearwardly therefrom alongside the extension 63. A bowed spring 66 joining the arms 64 and 65 urges the latter toward each other so that, when the feelers 25 and 26 are free, the arms contact opposite sides of the stud 61 and also the pin 62. The feeler unit is thus held in the centered position shown in Figs. 10 through 13. This position may be adjusted laterally of the feeler arms through the medium of the screws 53 and 54 above described.

For the purpose of greatly magnifying the alternate movements of the feeler unit away from the centered position as the feelers 25 and 26 are contacted successively by opposite side edges of a tooth face 14, these movements are converted into an electrical condition which is amplified and then reconverted into corresponding mechanical displacement of an indicator 68 which herein also records the directions and magnitudes of the feeler movements. The electrical conversion and amplifying may be effected by well known mechanism such as a linearly variable differential transformer shown schematically in Figs. 10 and 14 and comprising a magnetic plunger 69 projecting from and slidable endwise in a casing 70 and inductively coupled with three windings 71, 72 and 73 enclosing and axially spaced along the plunger. The outer end 76 of the plunger 69 extends at right angles to the feeler arm extension 63 and is held in contact with the latter by a spring 77. The primary coils 71 and 73 are wound in opposite directions and connected in series so that the voltages induced thereby in the secondary coil 72 exactly neutralize each other when the plunger is precisely centered relative to the windings. This condition may be obtained by manually turning a knob 74 to adjust the casing 70 along the plate 47 as permitted by a slot therein until the voltage is zero as read on a meter 75 (Fig. 1) and the stylus 68 is on the center line 87 of the chart. The casing is then clamped to the plate by suitable means. As the plunger thus moves with the feelers 25 and 26, the displacement to one side of center will cause a proportionate voltage to be induced in the secondary winding 72. Similarly, displacement of the feelers and the plunger away from center in the opposite direction results in a corresponding output voltage but of opposite sign. A displacement sensing unit of the above character is manufactured by Brush Electronic Company and known as BL 306.

The output from the transducer may be magnified by an electronic amplifier 79 which may be of well known construction such as Brush Electronic Company part No. BL 309. The amplified voltage from the amplifier is applied to a suitable recorder 80 such as a magnetic direct inking oscillograph (Brush Electronic part BL 201), which incorporates the usual d'Arsonval galvanometer for swinging the indicator and recording arm 68 across the continuously advancing tape 29 to record the marks 27 and 28 corresponding to the feeler movements. Recorders of this character usually have an auxiliary arm 81 (Fig. 1) for recording other events in response to operation of a switch 82. In this instance the switch is operated by a cam 83 fast on the cutter arbor and shaped to cause one mark 83ª to be produced on the tape at a predetermined point in each revolution of the cutter being tested. Thus the marks 27 and 28 corresponding to a particular tooth of the cutter may be identified easily.

*Operation*

The machine shown in Figs. 1 to 19 operates as follows assuming that the cutter whose lead or other dimensional characteristics are to be checked is mounted on the arbor 30 and the gearing 36 and 37 is adjusted to correlate the turning of the cutter with the correct lead of the hob teeth. The latter are thus centered accurately on the line 12 as they pass the feelers 25 and 26. The cutter is turned in a direction opposite to that of service use, that is to say, with the cutting faces 13 trailing so that the narrow leading ends 90 of the tooth sections first enter between the two feelers.

To adjust the feeler unit to the particular hob, the slide 49 is advanced to the hob by turning the handwheel 58 to bring the feeler points 25 and 26 into position on opposite sides of one tooth of the hob, preferably at the pitch points 17. By turning the screw 53, the feeler 26 is moved into the path of a cutting face 14 and slightly inwardly from the side edge 16 so that the feeler will be cammed outwardly as the edges of successive teeth pass it, these movements being indicated by outward swinging of the stylus 68, the extent of the inward adjustment of the feeler being such that the stylus movement is about half the width of the chart 29. The screw 59 is then adjusted to move the feeler 25 into a position for similar engagement and outward movement by the cutting edges 15 and corresponding movement of the stylus back and forth across the opposite side portion of the chart.

When it becomes necessary to check the calibration of the amplifier or recorder, the micrometer face 86 is brought into contact with the feeler arm 63 until a perceptible movement is noted on the stylus of the recorder. The reading of the micrometer and the position of the pointer is now noted and the micrometer is adjusted by a fixed amount, for example .001 of an inch, and the extent of the movement of the pointer noted. By adjusting a calibration screw inside of the amplifier case, this calibration may be corrected, knobs 88 being used to control the amount of amplification and the positioning of the stylus.

The entire apparatus now being conditioned, the hob is positioned with its terminal tooth ready to approach the feelers and the motor 36 is started to initiate the actual checking operation. The leading end of each tooth enters between the feelers 25 and 26 which remain out of contact with the flanks 21 and 22 until the tooth is approaching the position shown in Fig. 5 and has nearly passed the feeler 26. At this time, the flank 21 of the tooth at a point 90 (Fig. 5) engages the feeler 26 and cams in outwardly to the position shown in Fig. 5 just as the cutting face 14 of the tooth passes the feeler. At this time, the other feeler 25 is as shown out of contact with the tooth flank 22 so that the feeler unit is free to move to the right as viewed in Fig. 5 and upwardly as viewed in Fig. 10, the plunger 69 being pushed a corresponding distance inwardly away from the normally centered position against the action of the spring 66. As described above, this displacement will be amplified and swing the pointer 68 outwardly away from the centerline 87 to produce a transverse mark 27ª (Fig. 7) on the tape 29. When the edge of the cutting face passes beyond the feeler 26, the latter, together with the plunger 69 and the entire feeler support, will move inwardly and back to the centered position under the force of the spring 66. The pointer 68 thus moves reversely to form the other part 27ᵇ of the first mark 27.

The feeler 26 is now free and is disposed opposite the space between teeth as the tooth advances until a point near 91 (Fig. 6) on the flank 22 reaches the other feeler 25. The latter, together with both of the arms 42 and 43 move outwardly and to the left as viewed in Fig. 6. The accompanying outward movement of the plunger 69 upsets the electrical balance thereby causing the pointer to move outwardly from the opposite side of the centerline 87 and form the line 28ª of the first mark 28, the cutter face 14 of the tooth reaching the high point on the feeler as shown in Fig. 6 which corresponds to the outermost end of the mark. The pointer swings inwardly at 28ᵇ as the feeler 25 is allowed to move back to centered position while the cutting edge 15 is passing out of contact with the feeler. At this time, the feeler 26 will be out of contact with the next tooth.

The foregoing action is repeated as each successive tooth passes between the feelers 25 and 26 during its resultant advance along the helical line 12 by the combined rotary and axial movement of the hob. Thus, the feeler unit is moved alternately away from and back to the center line 87 as the cutting edges 15 and 16 of successive teeth of the hob pass between the feelers 25 and 26. By proper spacing of the feelers relative to the width of the cutting faces 14 of the teeth, the duration of the contacts between the teeth and the feelers may be made relatively short and still include the lead and other variations which are likely to occur in the regular manufacture of such cutters. By taking advantage of the tapered cross section of the hob teeth along an arcuate section line, only one of the feelers will contact the cutter at a time so that by in effect switching the control of the recorder 80 back and forth between the feelers, both sides of the teeth may be checked in a single movement of the row past the feeling unit.

Fig. 7 illustrates on an exaggerated scale some of the variations that may exist in a hob. If the hob teeth are perfectly formed relative to the hob axis and with the proper lead, throughout the entire length of the helical row of teeth, the points 17 on the side edges 15 and 16 at the pitch lines of each tooth will fall on lines 93 and 94 (Fig. 7) as each tooth passes the feelers 25 and 26. Such properly located cutting edges are indicated at 95 and the marks 27 and 28 formed thereby during the testing operation will be of uniform length as indicated at 27ª and 28ª. If a cutting edge is located improperly with respect to either line 93 or 94 inwardly as indicated at 96 or outwardly as at 97, the feeler movement will vary correspondingly and the lengths of the record marks will be shortened as at 98 or lengthened as at 99.

From the foregoing, it will be apparent that if the hob teeth are perfectly formed with a uniform lead on both sides, the record marks 27 and 28 corresponding to each tooth will be of equal lengths with the peaks or outer ends of all of the marks spaced equidistantly from the center line 87. By testing such a hob in accordance with the method above described, a chart such as that shown in Fig. 15 may be obtained. In this, it will be observed that the marks on either side vary in length no more than .0003 of an inch, a variation well within the tolerances normally allowed in precision hobs.

In the case of a right hand hob imperfectly formed with a long lead, the lengths of the marks on one side will increase progressively while correspondingly decreasing on the other side as shown in Fig. 16. Thus, for any given tooth, the marks 27 and 28 will be of different lengths and the composite band formed by the two sets of marks will extend diagonally across the center line 87.

By alternately recording the positions of opposite sides of successive teeth, other defects may be indicated. For example, if the teeth are not perfectly concentric with the hob axis, the hob will possess what is known as run-out or eccentricity. This results in a chart such as that shown in Fig. 17 in which the marks on opposite sides of the centerline increase and decrease in a regular pattern which repeats itself in each revolution of the cutter, the two marks for the same tooth being of equal lengths. Such shaping of the chart is due to the fact that the run-out prevents the feelers 25 and 26 from contacting the face edges 15 and 16 at the pitch or other selected points.

Fig. 18 shows a typical chart which is produced by a hob having what is known as wobble, that is, the teeth of the helical row are not centered properly with respect to the line 12 but weave back and forth across this line. Such weaving is evidenced by the staggered relation of the bulges 91 and 92 on opposite sides of the chart center line 87.

If the hob is defective because of both wobble and run-out, the chart produced may be shaped as shown in Fig. 19.

*Modified feeler arrangement*

Figs. 20 and 21 show an alternate and equivalent arrangement of the feelers 25 and 26 for measuring the lead and other dimensional characteristics of the two cutting edges 15 and 16 in a single pass while recording these characteristics along different margins of a traveling tape. Thus, instead of feeling of opposite sides of the teeth in a given row, or in the preferred construction described above, the feelers 25 and 26 are arranged for coaction with the opposed flanges 21 and 22 of the different but corresponding teeth in adjacent helical rows or convolutions. These tooth flanks define the side walls of a groove whose center line 12ª (Fig. 21) extends helically around the cutter and parallels the center line 12 of each row of teeth 10.

To adapt the feelers 25 and 26 for measuring the same movements when engaging the opposed sides of different teeth of adjacent rows as when engaging opposite sides of the teeth of a single row, it is desirable for the sake of simplicity to dispose the feelers in the groove between the adjacent rows of teeth and curve the free ends of the levers 42 and 43 so that they cross each other as shown in Fig. 20 and thus dispose the feelers 25 and 26 for engagement with the flanks 22 and 21 respectively. In other respects, the feeler mounting is identical (see Fig. 20) in construction to that described above, the same reference numbers being applied to the corresponding parts. Thus, the two feelers are mounted on a common support 63 which is urged toward a normal centered position determined by the stop 61 and is moving clockwise from this position as the side flank 22 of one tooth engages the feeler 26 and the cutting edge 15 moves past the latter as illustrated in Fig. 21. At this time, the feeler 25 is spaced from the opposed tooth flank 16 and does not interfere with the action of the feeler 26 in reversing the position of the cutting edge 15.

After the edge 15 of one tooth has passed the feeler 26, the feeler support 63 is returned to the centered position and remains there until the opposed flank 21 of the adjacent tooth comes into contact with the feeler 25 as the cutting edge 16 approaches the latter. After such engagement, the feeler support 63 is swung counterclockwise until the edge 16 passes the feeler.

As before, the movements of the feelers 25 and 26 transversely of the center line 12ᵃ as the edges 15 and 16 approach and pass the feelers are transmitted to the actuator rod 69 of the recording system and thus become recorded on opposite side margins of the tape 29 in the form of V-shaped marks 27 and 28 or so-called pips. Usually, it is desirable to record the movements 27 and 28 in the same positional relation as the edges 16 and 15 in the cutter being tested. This may be accomplished simply by reversing the phase relation of the supply voltages applied to the coils 71, 73 of the sensing and amplifying system. An alternative and perhaps simpler way of achieving the same relation would be to change the polarity of the voltage applied to the pen actuating motor of the recorder since in the unit preferably used as above described, this is a direct current voltage with open terminals.

This application is a continuation-in-part of my application Serial No. 459,913 filed October 4, 1954.

I claim as my invention:

1. For use in comparing the positional relation of cutter teeth arranged in a row extending around a rotary body, each tooth having sides converging toward each other along said row and away from the cutting face of the tooth, the combination of, means rotatably supporting said body to advance said teeth along a predetermined path with the narrow ends of each tooth leading the cutting faces thereof, a support mounted for movement transversely of said path in either direction away from a predetermined centered position, means for sensing, amplifying, and recording the successive movements of said support away from said centered position, and a pair of feelers on said support spaced apart a fixed distance less than the width of said teeth and straddling said path for engagement with opposite sides of said cutter teeth, said feelers being staggered relative to each other longitudinally of said row so that in passing said feelers the side flanks of successive ones of said cutter teeth engage the feelers successively and cam said support outwardly away from said centered position while the other feeler is out of contact with the other side flank of the tooth.

2. For use in comparing the positional relation of cutter teeth arranged in a row extending around a rotary body, each tooth having sides converging toward each other along said row and away from the cutting face of the tooth, the combination of, means rotatably supporting said body to advance said teeth along a predetermined path with the cutting faces trailing, a support mounted for movement transversely of said path in either direction away from a predetermined centered position, means for sensing, amplifying, and recording the successive movements of said support away from said centered position, and a pair of feelers on said support normally spaced apart a fixed distance less than the width of said cutting face and straddling said path for engagement with opposite sides of said cutter teeth, said feelers being staggered relative to each other longitudinally of said row so that in passing said feelers the side edges of the cutting face of successive ones of said cutter teeth engage the feelers successively and move said support outwardly away from said centered position while the other feeler is out of contact with the opposite side of the tooth.

3. For use in comparing the positional relation of cutter teeth arranged in a row extending around a rotary body, each tooth having side flanks converging toward each other along said row and away from the cutting face of the tooth, the combination of, means rotatably supporting said body to advance said teeth along a predetermined path with the cutting face trailing, a support mounted for movement transversely of said path and outwardly away from a predetermined centered position, two feelers on said support normally spaced apart a distance less than the width of said cutting faces and staggered along and straddling said path for successive engagement with opposite sides of said cutter teeth, means for sensing, amplifying, and recording the successive movements of said feelers away from said centered position, and means determining said centered position including a normally fixed stop, two members disposed on opposite sides of said stop and spring urged toward and normally held against the stop, a projection rigid with said support and disposed between said members so that when said feelers are free the support is held in said centered position by said member.

4. For use in comparing the positional relation of cutter teeth arranged in a row extending around a rotary body, each tooth having sides converging toward each other along said row and away from the cutting face of the tooth, the combination of, means rotatably supporting said body to advance said teeth along a predetermined path with the cutting faces trailing, a support mounted for movement transversely of said path, two feelers on said support normally spaced apart a distance less than the width of said cutting faces and staggered relative to each other longitudinally of said row for engagement with opposite sides of each passing tooth successively, means urging said support toward a normal centered position, a device responsive to the displacements of said support away from said normal position and operable to convert said displacements into electrical conditions of proportionate magnitudes but of opposite sign, means for amplifying said conditions, a chart, means for advancing said chart, a recorder for forming marks thereon, and means responsive to the amplified conditions to actuate said recorder and form marks of corresponding magnitude on opposite side margins of said chart.

5. For use in comparing the positional relation of cutter teeth arranged in a row extending around a rotary body, each tooth having sides converging toward each other along said row and away from the cutting face of the tooth, the combination of, means rotatably supporting said body to advance said teeth along a predetermined path with said cutting faces trailing, a pair of feelers normally spaced apart a distance less than the width of said cutting face, means supporting said feelers for movement in unison transversely of said path with the feelers straddling said path for engagement with opposite sides of said cutter teeth passing therebetween, said feelers and their supporting means having a predetermined normal position and said feelers being staggered relative to each other longitudinally of said row for engagement with each tooth successively and one at a time and thereby move the feelers alternately away from said normal position, and means for sensing and recording the alternate movements of said feeler supporting means during said engagement.

6. For use in comparing the positional relation of a plurality of cutter teeth projecting from a rotary body and each having sides converging toward each other in a direction extending circumferentially of said body and away from the cutting face of the tooth, oppositely facing side flanks of said teeth being arranged in a series of pairs arranged in a helical row with the flanks of each pair spaced along an intervening predetermined path, the combination of, means rotatably supporting said body for advance of said teeth along said predetermined path with said cutting faces of the tooth trailing, a pair of feelers straddling said path and spaced apart in a direction transversely of said path a distance intermediate the spacing of said flanks at the leading and trailing ends thereof, means supporting said feelers for movement in unison transversely of said path to engage the respective tooth flanks of each of said pairs as the latter pass the feelers, said feelers and supporting means having a predetermined normal position and said feelers being staggered relative to each other longitudinally of said path so as to engage each pair of tooth sides successively and one at a time whereby to move the feelers alternately in opposite directions from said normal position, and means for sensing and recording the alternate movements of said feeler supporting means during the successive engagement of the feelers with the tooth flanks of each of said pairs.

7. The combination as defined in claim 6 in which said normal position of said supporting means is determined by a fixed stop coacting with two members disposed on opposite sides of said stop and spring urged toward the latter and a projection rigid with said supporting means and disposed between said members so that when said feelers are free the supporting means is held in said normal position.

References Cited in the file of this patent

UNITED STATES PATENTS

| | | |
|---|---|---|
| 2,206,852 | Poupitch | July 2, 1940 |

FOREIGN PATENTS

| | | |
|---|---|---|
| 379,854 | Germany | Aug. 30, 1923 |
| 591,473 | Great Britain | Aug. 19, 1947 |
| 867,619 | Germany | Feb. 19, 1953 |